Sept. 23, 1952  B. D. MANNING  2,611,340
MECHANICAL BOLA
Filed Dec. 20, 1950
Fig. 1.
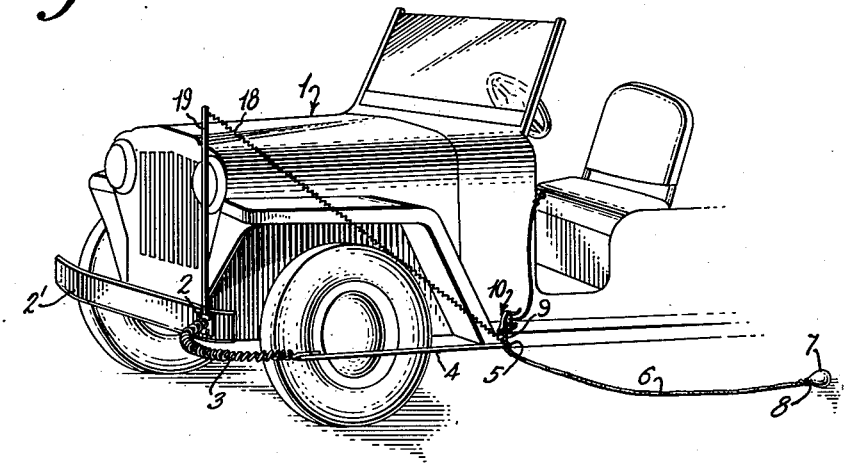
Fig. 2.
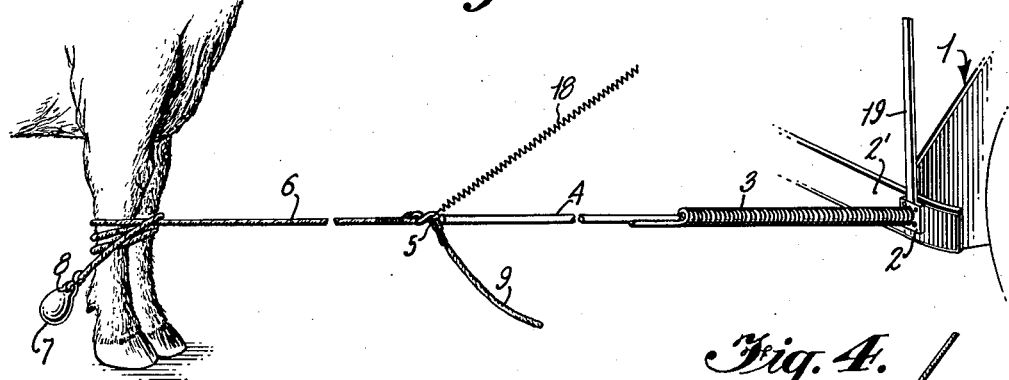
Fig. 4.
Fig. 3.
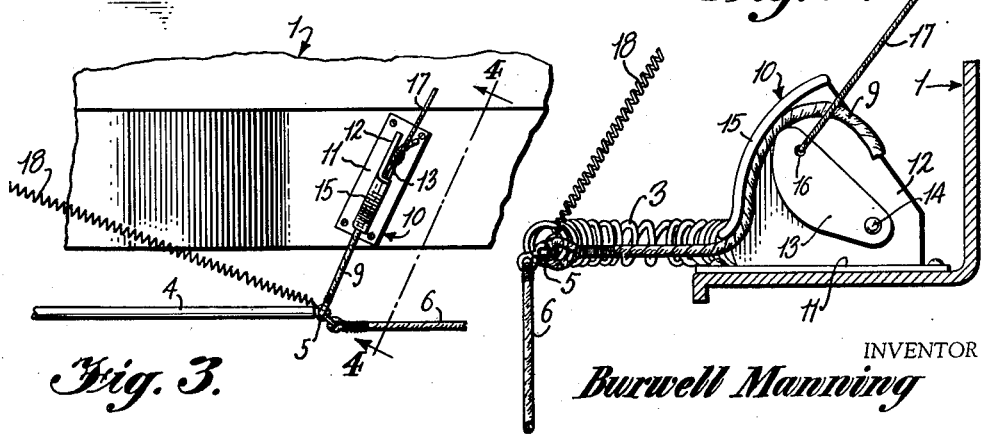
INVENTOR
Burwell Manning
BY Mason, Fenwick & Lawrence
ATTORNEYS Patented Sept. 23, 1952

2,611,340

UNITED STATES PATENT OFFICE 2,611,340

MECHANICAL BOLA

Burwell D. Manning, Columbia, S. C.

Application December 20, 1950, Serial No. 201,848

6 Claims. (Cl. 119—153)

This invention relates to mechanical bolas.

The bola as is generally known, is a hobbling device used in parts of South America, comprising one or more weighty objects such as a rock or iron ball at the end of a cord which is slung so as to contact the leg of an animal at a point on the cord near the weight, causing the weight to whirl several times around the leg, the weight ending its orbital movement by falling over the taut portion of the cord close to the leg, fixing a coil about the leg so that the animal cannot free itself.

The present invention has for its general object to apply the principle of the bola to a mechanical device mounted on a motor vehicle, useful in catching cattle.

In the low lying grazing lands of our South, and under similar conditions in other places, where the fields border wooded swamps or are interspersed with scrub forest growth or under brush, cattle when turned out on range revert to a semi-wild condition. They may receive no attention for weeks or even months, and grow unfamiliar with the sight of a human form, so that they acquire a fear of man, and when one comes in sight the cattle disappear into the swamps or thickets while he is yet at a great distance. It is practically impossible for a person to get close enough to such wary cattle to catch them by any ordinary means, it being impracticable to use a horse and lariat, for they can spot a man on a horse and take off to their marshy retreats where a horse cannot follow.

A peculiar trait of such cattle is their curiosity with respect to motor vehicles. They soon become accustomed to jeeps, for example, and will come up to examine one, particularly if the motor is running. One can drive right up to a bunch of cattle in a jeep, without any of them taking the trouble to move, so long as the driver stays in the car.

With the device of my invention attached to a jeep or other auto vehicle, it is a simple matter to capture a single animal without waste of time, or if it becomes necessary to inspect or treat a large number of cattle for screw-worm or other disease, this may be done expeditiously, for if the rest run off at the casting of one animal, curiosity brings them back shortly if the driver moves his vehicle about a bit.

The general object of my invention is to provide a bola, that is, a metal weight at the end of a stout cord, the opposite end of the cord being tied to the end of a rod having a spring at its base, which is secured to the front of the automobile, the rod being deflected laterally against the resistance of the spring, held tensioned by a latch until the auto vehicle has approached within a few feet of the cow to be caught, whereupon by release of the latch the rod flies out, whipping the cord against the animal's leg, causing the weight to whirl around the leg several times, laying the cord in a bond that effectively fetters the animal, which casts itself through its struggles or can be thrown by reversing the jeep.

Other objects of the invention will appear as the following description of a preferred and practical embodiment thereof proceeds.

Referring now to the drawings which form a part of the following specification and throughout the several figures of which the same reference characters have been used to denote identical parts:

Figure 1 is a perspective view of an auto vehicle equipped with a mechanical bola of my invention, the device being shown set, that is, in tensioned condition;

Figure 2 is a perspective view illustrating the bola released, showing its mode of fettering the animal;

Figure 3 is a plan view of the latch mechanism;

Figure 4 is a section taken along the line 4—4 of Figure 3.

Passing now to a detailed description of the several figures, the numeral 1 represents an auto vehicle, specifically a jeep, having the bumper 2'. The device of this invention is shown attached to the bumper, but it is not essential to the invention that it be so limited.

The power element of the bola is shown as a strong spiral spring 3, the base of which is welded or otherwise fixed to a plate 2. The axis of the spring is preferably normal to the face the plate. The plate 2 is suitably bolted or otherwise secured to the bumper, the spring 3 when in released position projecting outwardly from the bumper. The free end of the spring 3 is turned outwardly in the direction of its axis and a rod 4, which may be about four feet long, is welded to it.

The free end of the rod 4 has an eye 5 in which is tied one end of a stout cord 6, such as one-half inch rope, about six feet long. The free end of this rope carries an iron weight 7, which may be pear-shaped, as shown, and have an eye 8 through which the rope is tied. Any kind of weight both as to material or shape is the equivalent of the weight shown. Another piece of cord which in this case is a short tail 9 of small stuff such as sash cord, is tied into the eye 5 and cooperates with the latch to hold the bola device tensioned.

The latch, which as a whole is designated by the numeral 10, may be conveniently located on the running board of the auto vehicle. It consists of a supporting plate 11, having an upwardly extending flange 12. A cam 13 is pivotally mounted at 14 to rotate against this flange. Said flange has a rim 15 on one side, which is spirally related to the pivotal axis of the cam so as to progressively approach the cam in a direction toward the bola. In its position of closest approach there is insufficient space between the rim and cam to pass the tail 9.

The cam can be turned toward the diverging end of the rim 15 to widen the passage between said cam and rim. There is an eye 16 on the back of said cam to which the wire 17 is attached, the latter leading into the driver's compartment. The plate 2 is generally fixed to the bumper close to one end of the latter and the length of the spring and rod are such that when the rod is forced back parallel to the side of the automobile, flexing the spring as shown in Figure 1, the end of the rod is adjacent the front end of the running board. The parts are held in this set position by placing the tail 9 between the cam 13 and rim 15 of the latch, the cam being then turned so as to frictionally engage the tail which becomes jammed through the pull of the spring 3. The latch preferably is so located on the running board as to bring the taut tail and the operating wire as nearly as possible in the plane of rotation of the cam. The cord with the weight trails on the ground beside the automobile. At the proper moment the driver pulls the iron 17, which opens the latch, releasing the tail 9.

It is quite important that the bola shall swing substantially in a horizontal plane, to avoid the weight striking the animal above the legs. Also after it swings substantially horizontally, the weight is more likely to fall over the taut cord and secure the hitch. In order, therefore, to dampen the whipping action of the rod 4 induced by the dragging of the weight over irregular ground at the moment of release, the tip of the rod is supported by a long light spring 18, which extends from the eye 5 of the rod 4 to the top of a vertical bar 19, which is a unitary part of the plate 2.

It has been found advantageous to provide two of my mechanical bolas at each end of the bumper, oppositely deflected and simultaneously releasable. The cords then strike the animal on opposite sides of the legs, winds coils about the legs in opposite directions, and the weight of one almost inevitably will fall over the taut portion of the cord of the other.

Since these devices are merely duplications, it is not considered necessary to illustrate both.

While I have in the above description disclosed what I believe to be a preferred and practical embodiment of the invention, it will be understood by those skilled in the art that the specific details of construction and the arrangement of parts, as shown, are by way of example and not to be construed as limiting the scope of the invention.

What I claim is:

1. In an auto vehicle, a mechanical bola comprising a spring controlled rod swingably mounted at the front of said auto vehicle, means for latching said rod laterally diverted against spring resistance, a cord having a weight at its free end fastened to the tip of said rod normally held taut by said weight, said rod being mounted to whip forcibly under spring pressure in a substantially horizontal plane in front of said automobile when released from said latching means, engendering centrifugal flight of said cord and weight in said plane.

2. In an auto vehicle, a mechanical bola comprising a rod and a spring, said rod being mounted at the front of the auto vehicle through the intermediary of said spring, means for latching said rod in laterally diverted position against the resistance of said spring, a cord having a weight at its free end fastened to the tip of said rod normally held taut by said weight, said rod being so mounted as to whip forcibly under spring pressure in a substantially horizontal plane in front of the auto vehicle when released from said latching means, engendering the centrifugal flight of said cord and weight in said plane.

3. Mechanical bola comprising a plate adapted to be secured to an auto vehicle, a spring secured to said plate extending outwardly from the front face thereof, a rod having one end fixed to the outer end of said spring, extending outwardly with respect to said plate when said spring is in repose state, said rod being divertible laterally against spring pressure to store potential energy derived from said spring, a latch for holding said rod in diverted position, and means for releasing said latch, a cord having a weight at its free end fastened to the tip of said rod normally held taut by said weight, said rod being mounted to whip forcibly under spring pressure when released from said latching means engendering the centrifugal flight of said cord and weight.

4. Mechanical bola comprising a plate adapted to be secured to an auto vehicle, a heavy coil spring secured at one end to said plate and extending outwardly therefrom, a rod fixed at one end to the free end of said spring and extending outwardly in the direction of the axis of said spring when the latter is in repose state, said rod being divertible laterally through the bending of the coil of said spring to store potential energy derived from said spring, a latch adapted to be secured to the auto vehicle at a point adjacent the tip of said rod for holding the latter in diverted position and means for releasing said latch, a cord having a weight at its free end fastened to the tip of said rod normally held taut by said weight, said rod being mounted to whip forcibly under spring pressure when released from said latch engendering the centrifugal flight of said cord and weight.

5. In an auto vehicle having a bumper, a mechanical bola comprising a plate secured to the forward side of said bumper, a coil spring fixed to said plate and extending outwardly therefrom, a rod having one end fixed to the free end of said spring, and extending outwardly in the same general direction as said spring when the latter is in repose state, said rod being divertible laterally through the bending of the coil of said spring, a latch suitably secured on said auto vehicle adjacent the tip of said rod, a cord having a weight at its free end fastened to the tip of said rod normally held taut by said weight, another cord fastened to the tip of said rod engaged by said latch for holding said rod diverted laterally, and means for releasing said latch whereby under spring pressure said rod whips forcibly in a substantially horizontal plane forward of said auto vehicle engendering the centrifugal flight of said cord and weight.

6. In an auto vehicle as claimed in claim 5, an auxiliary spring suspending the free end of said rod with sufficient tension to counterbalance the gravitational tendency of said rod to deviate from its horizontal plane of movement.

BURWELL D. MANNING.

REFERENCES CITED

The following references are of record in the file of this patent:

UNITED STATES PATENTS

| Number | Name | Date |
| --- | --- | --- |
| 1,328,719 | Condon | Jan. 20, 1920 |
| 2,318,139 | Calabrese | May 4, 1943 |